United States Patent Office 2,791,953
Patented May 14, 1957

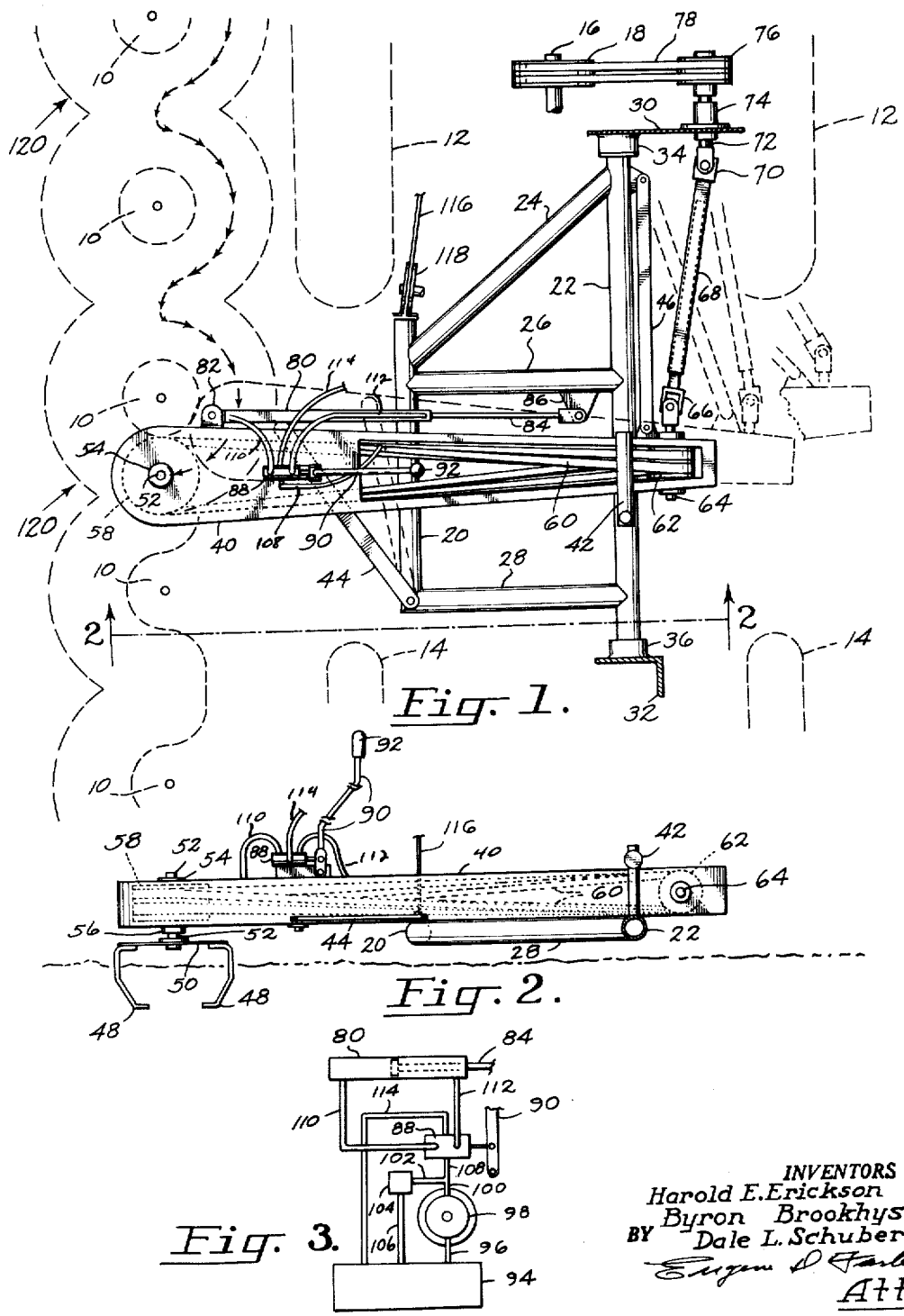

2,791,953
POWER CULTIVATOR

Harold E. Erickson, Auburn, Byron Brookhyser, Milton, and Dale L. Schubert, Tacoma, Wash., assignors to Industrial Development Co., Tacoma, Wash., a corporation of Washington Application October 25, 1954, Serial No. 464,522

7 Claims. (Cl. 97—43)

This invention relates to power cultivators and pertains particularly to a rotary hoe designed for attachment to a tractor for use in cultivating around posts and row crops such as rhubarb, corn and, particularly, cane berries.

In growing raspberries, black raspberries, boysenberries, and other cane berries on a commercial scale the plants are grown in hills spaced apart in rows which it is necessary to cultivate several times a year. At the present time much of this cultivation is done manually for want of machinery capable of working around the hills in a given row without damaging the plants. Such manual cultivation obviously is a tedious, time consuming and costly operation, adding substantially to the expense of growing the berries.

Accordingly it is the general object of the present invention to provide a mechanical, powered cultivator for cultivating around cane berries and similar crops, both along the row and between the hills comprising the row.

It is another object of this invention to provide a power cultivator which may be attached to a tractor or other vehicle and which is precise in its operation, enabling close approach to plants in the same row without damaging them.

It is another object of this invention to provide a power cultivator which may be adjusted rapidly to various operating positions, thereby enabling rapid movement along the row.

It is another object of this invention to provide a power cultivator which is versatile and may be adjusted for removing the weeds efficiently from a row of plants which may be irregular and of uneven spacing.

It is another object of this invention to provide a power cultivator which is so controlled that it follows the hand of the operator, facilitating its adjustment to its various operating positions.

It is another object of this invention to provide a power cultivator which may be operated with a minimum of operator effort and error.

The manner in which the foregoing and other objects of this invention are accomplished will be apparent from the accompanying specification and claims considered together with the drawings, wherein:

Figure 1 is a plan view of the presently described power cultivator;

Figure 2 is a view in side elevation of the presently described power cultivator taken along the line 2—2 of Figure 1; and Figure 3 is a schematic view of an hydraulic circuit which may be employed in the presently described power cultivator.

In the drawing, the power cultivator of this invention is illustrated as applied to the cultivation of a row of cane berries, planted in hills 10. It is shown attached to a self-propelled vehicle, such as a tractor, the rear wheels of which are indicated at 12 and the front wheels at 14.

As is usual with such vehicles, the tractor is provided with hoisting means, not shown, and with a power take off comprising the driven shaft 16 and pulley 18.

The cultivating attachment is mounted on a frame which may be variously constructed, but which may comprise, for example, the spaced apart longitudinal members 20, 22 interconnected by the spaced apart transverse members 24, 26, 28. The entire frame is attached to structural members 30, 32 of the tractor and is mounted for oscillation about one of the longitudinal members, for example, member 22, which accordingly is mounted in bearings 34, 36.

A cultivator arm 40 which carries the cultivating tool is mounted for transverse reciprocal movement on the frame. Accordingly it may be placed across the longitudinal members 20, 22 in sliding engagement therewith. Its reciprocating movement is guided by guide 42 and directed in an arcuate path by means of a pair of radius bars which interconnect its opposite ends to the frame of the apparatus. Thus radius bar 44, pivoted at both of its ends, interconnects the forward end of the cultivating arm with an end of frame member 20. Similarly radius bar 46 interconnects the inner end of the cultivating arm with the end of frame member 22 which is opposite the pivot connection of bar 44 with member 20.

The cultivating tool which may be mounted on the outer end of cultivating arm 40 may be of diverse shapes and functions. In the illustrated form it comprises a rotary hoe provided with the hoeing elements or teeth 48. These are mounted on a plate 50 secured to a shaft 52 which is journalled in bearings 54, 56. A pulley 58 is keyed or otherwise rigidly affixed to shaft 52 and provides means for driving the same.

The rotary hoe assembly may be driven from the power take off of the tractor. Thus pulley 58 is driven by belt 60 which in turn is driven from pulley 62. The latter pulley is fixed to a shaft 64 journalled in bearings mounted on the inner end of arm 40. Shaft 64, in turn, is connected to a first universal joint 66 which is connected through telescoping, splined, drive shaft 68 to a second universal joint 70. Universal joint 70 in turn is connected to a shaft 72 rotatably mounted in bearings 74 and having affixed on its outer end a pulley 76. Pulley 76 carries drive belt 78 which passes over pulley 18 of the tractor power take off 16, or other power source. Accordingly, a flexible drive is provided for positively driving the cultivating head while permitting free movement of the arm on which it is mounted.

The movement of cultivating arm 40 which carries the cultivating head, occurs in both horizontal and vertical directions. Thus it may be reciprocated transversely of the tractor for reaching in and around the berry hills. Also, it may be elevated for adjustment of the cultivation depths.

The motor means provided for reciprocating the cultivating arm comprises, in the illustrated embodiment, a fluid operated cylinder, specifically a hydraulic cylinder 80, the base of which is pivotally connected to a boss 82 affixed to arm 40. Its piston rod 84, is pivotally connected to a boss 86 on a frame member, for example, the transverse frame member 26. Accordingly, extension and retraction of piston rod 84 reciprocates the cultivating arm 40, the reciprocal movement being arcuate, however, because of the controlling influence of radius bars 44, 46.

Cylinder 80 is controlled through a four-way valve 88 mounted on the movable cultivating arm 40 and operated through lever 90, the handle 92 of which is near the hand of the tractor operator. Mounting the valve on the movable arm in this manner has the important advantage of enabling the operator to guide the arm precisely by position control. In other words, upon movement of the valve handle a predetermined amount, cultivator arm 40 will follow and move in the same direction substantially instantaneously by an equal increment. Thus an extremely precise control is afforded of the position of the arm and of the cultivating head which it carries.

The hydraulic circuit including cylinder 80 is illustrated in Figure 3. Hydraulic fluid contained in a reservoir 94 is pumped through conduit 96 by pump 98 into conduit 100. If the setting of valve 88 is such that fluid is not demanded by cylinder 80, the fluid is pumped through conduit 114, which empties into reservoir 94.

However, if the setting of valve 88 is such as to demand extension of piston rod 84 and hence of arm 40, fluid flows through conduit 108, valve 88, conduit 110 and thence into the rear end of cylinder 80, behind the piston therein. The exhausted fluid from in front of the piston flows through conduit 112, valve 88, and conduit 114 back into reservoir 94.

If the setting of valve 88 is such as to result in the retraction of piston rod 84 and cultivator arm 40, the hydraulic fluid flows through line 112 into the cylinder ahead of the piston, causing retraction of the piston rod. The exhausted fluid then flows through conduit 110, valve 88 and return line 114. If valve 88 is held in either of its extreme operating positions, and the piston of cylinder 80 correspondingly is in one of its extreme positions so that the fluid does not flow through lines 110 or 112, then it traverses the by pass circuit including conduit 102, relief valve 104 and conduit 106.

Vertical adjustment of cultivating arm 40 is secured by means of cable 116 attached to frame member 20, passing over pulley 118 and attached to the hoisting mechanism of the tractor. Accordingly when the latter is actuated, it oscillates the frame about longitudinal member 22 until the desired elevation of the cultivating head has been secured.

Operation

The operation of the presently described power cultivator is as follows:

As the tractor operator approaches the row of berries, he adjusts the elevation of the cultivating element 48 by suitable adjustment of cable 116 through the hoisting mechanism of the tractor. He also throws in the power take off, whereupon the cultivating tool is driven by belt 60, shaft 64, universal joint 66, splined telescoping shaft 68, universal joint 70, shaft 72 and belt 78 connected to shaft 16 of the power take off. This drives the cultivating element continuously at the desired rate.

The operator then drives the tractor between the rows of plants with one hand on the handle 92 of lever 90, which controls valve 88, actuating hydraulic cylinder 80. As the tractor proceeds along the row, manual adjustment of the lever arm is made so that the cultivator arm 40 which carries the cultivator head reciprocates laterally of the moving tractor, the movement of the arm being arcuate however because of the control exerted by radius bars 44, 46.

As a result, the cultivating tool traces a path indicated by the arrows in Figure 1. It will be apparent that because of the arcuate motion imparted to the tool by radius bars 44, 46, the tool may be brought into close proximity to hills 10 after which it backs off with respect to the tractor and withdraws from the hills as the tractor advances, thereby cultivating effectively the area around one side of the hills and between the same. Then on the return trip along the other side of the row the cultivating operation is completed throughout the entire area included within the circles indicated generally at 120 in Figure 1.

In this manner there is afforded precise position control of the cultivating head since the head follows the hand of the operator substantially instantaneously as he moves lever 90 inwardly and outwardly. As a consequence, the row may be cultivated cleanly and thoroughly with no damage to the plants and with a minimum of operator effort and fatigue.

It is to be understood that the form of our invention herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. A power tool assembly, comprising a frame, an elongated tool arm extending transversely of the frame, a power operated tool mounted on the arm, motor means interconnecting the frame and arm for extending and retracting the latter, first radius bar means pivotally connected at one end to a forward portion of the arm and at the opposite end to the frame a spaced distance from one side of the arm, and second radius bar means pivotally connected at one end to a rearward portion of the arm and at the opposite end to the frame a spaced distance from the opposite side of the arm, the radius bar means thereby imparting arcuate motion to the arm about spaced axes as the arm is extended and retracted.

2. A power tool assembly, comprising a frame, an elongated tool arm extending transversely of the frame, a power operated tool mounted on the arm, motor means interconnecting the frame and arm for extending and retracting the latter, first radius bar means pivotally connected at one end to a forward portion of the arm and at the opposite end to the frame a spaced distance from one side of the arm, second radius bar means pivotally connected at one end to a rearward portion of the arm and at the opposite end to the frame a spaced distance from the opposite side of the arm, the radius bar means thereby imparting arcuate motion to the arm about spaced axes as the arm is extended and retracted, and manually operated motor control means mounted on the arm and operable from a position adjacent the tool, the control means being movable in the same directions as it causes the arm to move, thereby enabling the operator to gauge the position of the tool by the position of his hand on the manual control.

3. A power cultivator, comprising a frame, an elongated cultivator arm extending transversely of the frame, a power operated cultivator head mounted on the arm, motor means interconnecting the frame and arm for extending and retracting the latter, first radius bar means pivotally connected at one end to a forward portion of the arm and at the opposite end to the frame a spaced distance from one side of the arm, and second radius bar means pivotally connected at one end to a rearward portion of the arm and at the opposite end to the frame a spaced distance from the opposite side of the arm, the radius bar means thereby imparting arcuate motion to the arm about spaced axes as the arm is extended and retracted.

4. A power cultivator, comprising a frame, an elongated cultivator arm extending transversely of the frame, a power operated cultivator head mounted on the arm, motor means interconnecting the frame and arm for extending and retracting the latter, first radius bar means pivotally connected at one end to a forward portion of the arm and at the opposite end to the frame a spaced distance from one side of the arm, second radius bar means pivotally connected at one end to a rearward portion of the and at the opposite end to the frame a spaced distance from the opposite side of the arm, the radius bar means thereby imparting arcuate motion to the arm about spaced axes as the arm is extended and retracted, and manually operated motor control means mounted on the arm and operable from a position adjacent the cultivator head, the control means being movable in the same direction as it causes the arm to move, thereby enabling the operator to gauge the position of the head by the position of his hand on the manual control.

5. A power cultivator adapted for attachment to a tractor, said cultivator comprising a frame, means for attaching the frame to the tractor, an elongated cultivator arm extending transversely of the tractor, a power operated cultivator head mounted on the arm, motor means interconnecting the frame and arm for extending and retracting the latter, first radius bar means pivotally connected at one end to a forward portion of the arm and at the opposite end to the frame a spaced distance forwardly of the arm, and second radius bar means pivotally connected at one end to a rearward portion of the arm and at the opposite end to the frame a spaced distance rearwardly of the arm, the radius bar means thereby imparting arcuate motion to the arm about spaced axes as the arm is extended and retracted, said arcuate motion acting to move the cultivator head in a direction opposite the direction of travel of the tractor, thereby enabling withdrawal of the cultivator head from objects which it aproaches.

6. A power cultivator adapted for attachment to a tractor, said cultivator comprising a frame, means for attaching the frame to the tractor, an elongated cultivator arm extending transversely of the tractor, a power operated cultivator head mounted on the arm, motor means interconnecting the frame and arm for extending and retracting the latter, first radius bar means pivotally connected at one end to a forward portion of the arm and at the opposite end to the frame a spaced distance forwardly of the arm, second radius bar means pivotally connected at one end to a rearward portion of the arm and at the opposite end to the frame a spaced distance rearwardly of the arm, the radius bear means thereby imparting arcuate motion to the arm about spaced axes as the arm is extended and retracted, said arcuate motion acting to move the cultivator head in a direction opposite the direction of travel of the tractor, thereby enabling withdrawal of the cultivator head from objects which it approaches, and manually operated motor control means mounted on the arm and operable from a position adjacent the cultivator head, the control means being movable in the same directions as it causes the arm to move, thereby enabling the operator to gauge the position of the head by the position of his hand on the manual control.

7. A power cultivator adapted for attachment to a tractor provided with power take off means, said cultivator comprising a frame, means for ataching the frame to the tractor, an elongated cultivator arm extending transversely of the tractor, a power operated cultivator head mounted on one end of the arm, motor means interconnecting the frame and arm for extending and retracting the latter, first radius bar means pivotally connected at one end to a forward portion of the arm and at the opposite end to the frame a spaced distance from one side of the arm, second radius bar means pivotally connected at one end to a rearward portion of the arm and at the opposite end to the frame a spaced distance from the opposite side of the arm, the radius bar means thereby imparting arcuate motion to the arm about spaced axes as the arm is extended and retracted, drive means extending from the head to the opposite end of the arm, and telescoping drive shaft means pivotally interconnecting the power take off and said drive means at said end of the arm opposite the head.

References Cited in the file of this patent

UNITED STATES PATENTS

| | | |
|---|---|---|
| 2,539,174 | Badieme et al. | Jan. 23, 1951 |
| 2,630,746 | Thompson | Mar. 10, 1953 |
| 2,694,355 | Pertics et al. | Nov. 16, 1954 |

UNITED STATES PATENT OFFICE

CERTIFICATE OF CORRECTION

Patent No. 2,791,953                                             May 14, 1957

Harold E. Erickson et al.

It is hereby certified that error appears in the printed specification of the above numbered patent requiring correction and that the said Letters Patent should read as corrected below.

Column 4, line 62, after "of the" insert -- arm --; column 5, line 29, for "bear" read -- bar --; column 6, line 10, for "ataching" read -- attaching --.

Signed and sealed this 8th day of October 1957.

(SEAL)
Attest:
KARL H. AXLINE
Attesting Officer

ROBERT C. WATSON
                                                                              Commissioner of Patents